United States Patent Office 3,237,791
Patented Mar. 1, 1966

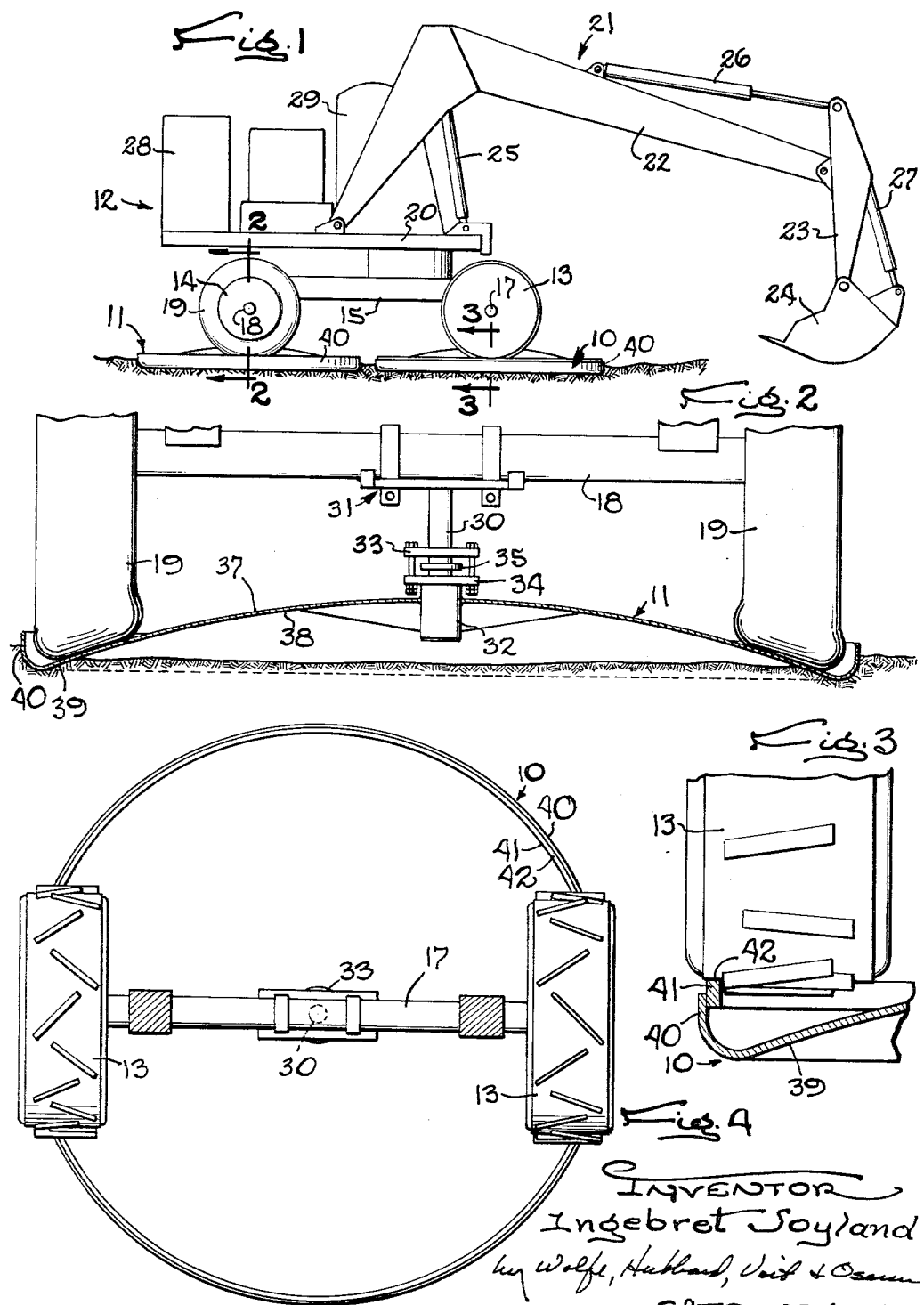

3,237,791
VEHICLE CARRYING PLATE
Ingebret Soyland, Bryne, near Stavanger, Norway
Filed June 18, 1964, Ser. No. 376,121
3 Claims. (Cl. 214—138)

This invention relates to so-called carrying plates of the type disclosed in United States Patent No. 3,021,023 for use on vehicles such as mobile excavators of the type that are moved during a digging operation in extremely soft ground by raising and pivoting first one end and then the other to pivot the excavator across the ground. To distribute the weight of such excavators over a greater area and thus reduce sinking of the wheels into the ground, two carrying plates are disposed beneath the front and rear wheels of the excavator and are pivotally secured to the chassis midway between the wheels to be lifted with the wheels and carried over the ground.

One object of the present invention is to provide an improved carrying plate of the foregoing character which is more easily raised out of mud and the like.

A more specific object is to trap a pocket of air beneath the plate and thereby facilitate the breaking of the suction acting on the plate.

A further object is to construct the improved carrying plate of relatively lightweight material with a novel track for engaging and supporting the usual pair of metal wheels in service use without damage to the plate.

Other objects and advantages of the invention will become apparent from the following detailed description taken in connection with the accompanying drawings, in which—

FIGURE 1 is a side elevational view of an excavator equipped with carrying plates embodying the novel features of the present invention.

FIG. 2 is an enlarged fragmentary cross-sectional view taken substantially along the lines 2—2 of FIG. 1.

FIG. 3 is an enlarged fragmentary cross-sectioal view taken substantially along the line 3—3 of FIG. 1.

FIG. 4 is an enlarged plan view of the front wheel assembly and carrying plate shown in FIG. 1.

As shown in the drawings for purposes of illustration, the invention is embodied in a pair of carrying plates 10 and 11 of the type disclosed in the aforesaid patent for use on a mobile excavator 12 (FIG. 1) having freely rotatable front and rear wheels 13 and 14 which rest on the carrying plates when the excavator is operated on soft ground. Thus, the carrying plates distribute the weight of the excavator over a substantial area and reduce sinking of the wheels into the ground.

The basic structure of the excavator 12 is well-known and will be described only generally herein. The excavator includes a chassis 15 provided with front and rear axles 17 and 18 on its underside with the wheels 13 and 14 journaled on the opposite ends of the axles. Preferably, the rear wheels are of the type having rubber tires 19 so that the excavator may be towed at relatively high road speeds to and from the work site with the front wheels supported in an elevated position above the road. Since the front wheels do not engage the road during such towing, they preferably are of the more durable type having relatively wide metal treads. Pivotally mounted on a platform 20 on the chassis is a boom 21 comprising an angle-shaped jib arm 22 pivoted on the platform with a shovel arm 23 pivoted intermediate its ends on the free end of the jib arm and pivotally supporting a shovel 24 on its free lower end.

Suitable power actuators 25, 26 and 27 are provided to raise and lower the jib arm relative to the platform 20, swing the shovel arm 23 relative to the jib arm, and rotate the shovel 24 about its axis on the shovel arm. Herein, these actuators are hydraulic cylinders supplied with fluid under pressure by a motor and pump assembly 28 on the platform and controlled by an operator in the usual cab 29. That platform is mounted on the chassis for rotation about a vertical axis by another hydraulic motor (not shown). Thus, the shovel 24 is swingable from side to side by rotation of the platform and up and down by the various actuators to perform the usual digging operation.

To move such an excavator 12 during the digging operation, the boom 21 is lowered to press the shovel 24 against the ground and raise one set of wheels 13, 14 off the ground so that the excavator is supported solely by the boom and one pair of wheels. Then, the boom and the platform 20 on the chassis are rotated in one direction to swing the raised end of the excavator in the opposite direction and lower the elevated wheels to the ground. After the boom is swung to the opposite end of the excavator, the shovel again is pressed against the ground to raise the other pair of wheels, and the boom is rotated to swing this pair in the same direction as the other pair. During such pivotal movement of the excavator, the pair of wheels cooperating with the boom to support the excavator simply rotates on the associated carrying plate 10, 11. Machines of this type maintain their mobility even on boggy ground and may be moved step-by-step to any location on the work site.

Each carrying plate 10, 11 is circular in shape and is large enough to extend at least partially under both of the associated wheels. As shown in FIG. 2, the plates are pivoted on the chassis 15 by means of a vertical shaft 30 fastened at its upper end to the axle 17, 18 by means of a clamp 31 releasably secured to the axle midway between the wheels. The shaft telescopes at its lower end to a sleeve 32 mounted on the carrying plate at the center of the latter. To permit a limited amount of axial movement of the shaft relative to the carrying plate, two disks 33, 34 are fastened to the upper end of the sleeve and spaced apart above and below a radial ring-like projection 35 on the shaft. The lower disk 34 is secured to the upper end of the sleeve as by welding and the upper disk 33 is fastened to the lower disk by a series of shoulder bolts. With this arrangement, the two disks cooperate with the projection 35 to form a lost-motion connection for raising and lowering the carrying plate with the axle and yielding after the plate engages the ground thereby to insure that the weight of the vehicle is supported by the wheels rather than by the pivot shaft during operation of the excavator.

The present invention contemplates a new and improved carrying plate 10, 11 which is more easily raised out of mud and the like. For this purpose, the circular central portion 37 of the plate is dished upwardly to form a downwardly facing concave bottom surface 38 which traps a pocket of air beneath the plate as shown in FIG. 2 thereby minimizing the area of contact of the plate with the ground and facilitating the breaking of the suction that results when a partially sunken plate is pulled out of the mud. Moreover, the trapped air pocket under the plate reduces the area of contact of the plate with lawns and the like and thus minimizes damage to the ground in cultivated areas. In effect, the excavator is supported partly by the annular lower edge portion 39 of the plate and partly by the trapped air in the pocket.

In addition, the outer edge portion of the plate is turned upwardly to form a generally cylindrical peripheral flange 40 surrounding the central portion 37 of the plate and preferably integral therewith. One advantage of this flange is that it prevents mud and water from flowing over the plate and adding additional resistance to lifting of the plate during movement of the excavator when the plates are sunken to a moderate depth in the mud, that is, a depth less than the height of the flange. More importantly, the upper edge surface of the flange may be utilized as a track for the metal wheels 13 to maintain the wheels out of engagement with the central dome-like portion of the plate. Thus, the carrying plate may be constructed of relatively lightweight metal without danger of damage to the dome by the metal wheels.

Preferably, a hardened ring 41 (FIGS. 3 and 4) is secured to the flange of the forward plate 10 around either the inside or outside of the latter with the upper surface 42 of this ring spaced above the upper end of the flange for engagement with the front wheels. With this arrangement, the entire carrying plate, except for this ring, may be one piece of metal that might be damaged by rolling contact with the metal treads. On the other hand, the strength of the flange is sufficient to support one-half of the weight of the excavator.

As shown in FIG. 2 the rear wheels 11 ride inside the upturned flange 40 of the plate 11 preferably with a substantial clearance between each wheel and the inner surface of the flange. In this instance, the front and rear carrying plates are the same size and the spacing of the opposite sides of the rear wheels is substantially less than that of the front wheels.

I claim as my invention:

1. The combination with a vehicle such as an excavator having front and rear pairs of wheels, the wheels of one of said pairs having tires composed of resiliently yieldable material with opposite sides spaced a first distance apart, and the wheels of the other pair having treads composed of metal with opposite sides spaced a second substantially greater distance apart, of first and second similar carrying plates disposed beneath said wheels to support said vehicle on soft ground and each comprising an upturned generally cylindrical peripheral flange terminating in an upwardly facing annular edge, a central upwardly dished portion joined to the lower portion of said flange and forming a concave bottom wall on said plate, and means at the center of said dished portion for connecting each plate to said vehicle midway between one pair of wheels, said first plate being disposed beneath said metal wheels with the flange thereof engaging the treads to form a track therefor, and said second plate being disposed beneath said tires with the flange thereof spaced outwardly from the tires whereby the latter ride on said dished portion.

2. The combination defined by claim 1 in which said annular edge is formed by a hardened metal ring fastened to and extending around the flange of the first blade with the top surface of said ring spaced above the flange for engagement with said metal wheels.

3. A circular carrying plate adapted to be disposed beneath a pair of wheels of a vehicle such as an excavator and pivotally connected to the vehicle to provide a single circular track for both of said wheels, said plate having an upturned generally cylindrical peripheral flange terminating in an upwardly facing annular edge, a central upwardly dished portion joined to the lower portion of said flange and forming a downwardly facing concave bottom wall for said plate, and means at the center of said plate for pivotally connecting the plate to the vehicle midway between said wheels.

References Cited by the Examiner
UNITED STATES PATENTS 2,364,553  12/1944  Rische.
3,021,023  2/1962  Soyland et al. _____ 214—138

HUGO O. SCHULZ, *Primary Examiner.*